(12) United States Patent
Seo et al.

(10) Patent No.: US 11,122,563 B2
(45) Date of Patent: Sep. 14, 2021

(54) PRIORITY-BASED INTERFERENCE CONTROL METHOD IN WIRELESS COMMUNICATION SYSTEM AND DEVICE THEREFOR

(71) Applicant: LG Electronics Inc., Seoul (KR)

(72) Inventors: Hanbyul Seo, Seoul (KR); Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 15 days.

(21) Appl. No.: 16/346,677

(22) PCT Filed: Nov. 1, 2017

(86) PCT No.: PCT/KR2017/012209
§ 371 (c)(1),
(2) Date: May 1, 2019

(87) PCT Pub. No.: WO2018/084550
PCT Pub. Date: May 11, 2018

(65) Prior Publication Data
US 2019/0281601 A1      Sep. 12, 2019

Related U.S. Application Data

(60) Provisional application No. 62/416,127, filed on Nov. 1, 2016.

(51) Int. Cl.
*H04W 72/04* (2009.01)
*H04W 76/15* (2018.01)
(Continued)

(52) U.S. Cl.
CPC ......... *H04W 72/0446* (2013.01); *H04J 11/00* (2013.01); *H04W 72/1215* (2013.01); *H04W 72/1247* (2013.01); *H04W 76/15* (2018.02)

(58) Field of Classification Search
None
See application file for complete search history.

(56) References Cited

U.S. PATENT DOCUMENTS

2014/0328277 A1   11/2014   Xiao et al.
2016/0242186 A1*   8/2016   Nissila .............. H04W 28/0252
(Continued)

FOREIGN PATENT DOCUMENTS

CN      104380642       2/2015
KR      1020140123288   10/2014
(Continued)

OTHER PUBLICATIONS

PCT International Search Report in International Application No. PCT/KR2017/012209, dated Feb. 9, 2018, 19 pages (with English translation).

(Continued)

*Primary Examiner* — Saad Khawar
(74) *Attorney, Agent, or Firm* — Fish & Richardson P.C.

(57) ABSTRACT

In a multi-cell communication system, a first cell transmits and receives a signal in a particular resource set on which a higher priority is given to a second cell. In some scenarios, the first cell performs operations that include: determining whether or not a second cell uses a particular resource set in a first transmission time interval (TTI) among a plurality of first TTIs, which correspond to a first cell, comprised in a second TTI corresponding to the second cell; and, if it is determined that the second cell does not use the particular resources in the first TTI, transmitting and receiving a signal in remaining TTIs, among the plurality of first TTIs, other than the first TTI.

8 Claims, 11 Drawing Sheets

| | TTI 0 | TTI 1 | TTI 2 |
|---|---|---|---|
| Cell A | TX | No TX | TX |

| Cell B | Sense | No TX | Sense | TX | Sense | No TX |
|---|---|---|---|---|---|---|
| | TTI 0-0 | TTI 0-1 | TTI 0-2 | TTI 0-3 | TTI 1-0 | TTI 1-1 | TTI 1-2 | TTI 1-3 | TTI 2-0 | TTI 2-1 | TTI 2-2 | TTI 2-3 |

(51) Int. Cl.
*H04W 72/12* (2009.01)
*H04J 11/00* (2006.01)

(56) References Cited

U.S. PATENT DOCUMENTS

| | | | |
|---|---|---|---|
| 2016/0270116 A1* | 9/2016 | Lin | H04W 72/14 |
| 2016/0309466 A1 | 10/2016 | Chen et al. | |
| 2018/0007643 A1* | 1/2018 | Tiirola | H04W 52/146 |
| 2019/0082436 A1* | 3/2019 | Huang | H04W 16/14 |

FOREIGN PATENT DOCUMENTS

| | | |
|---|---|---|
| KR | 20170138420 | 12/2017 |
| WO | WO2014073131 | 5/2014 |
| WO | WO2015174437 | 11/2015 |
| WO | WO2016026656 | 2/2016 |
| WO | WO2016040290 | 3/2016 |
| WO | WO-2016048798 A1 * | 3/2016 ........ H04W 74/0816 |

OTHER PUBLICATIONS

Chinese Office Action in Chinese Application No. 201780071588.1, dated Apr. 2, 2020, 15 pages (with English translation).
Extended European Search Report in European Application No. 17868247.2, dated Jun. 5, 2020, 8 pages.
Japanese Notice of Allowance in Japanese Application No. 2019-522950, dated Jun. 9, 2020, 5 pages (with English translation).
Panasonic, "ICIC among small cells," R1-132139, 3GPP TSG RAN WG1 Meeting #73, Fukuoka, Japan, dated May 20-24, 2013, 10 pages.
Intel Corporation, "Discussion on TTI Shortening," R1-156540, 3GPP TSG RAN WG1 Meeting #83, Anaheim, USA, Nov. 15-22, 2015, 4 pages.
Korean Notice of Allowance in Korean Application No. 10-2019-7013667, dated Nov. 23, 2020, 4 pages (with English translation).

* cited by examiner

FIG. 2
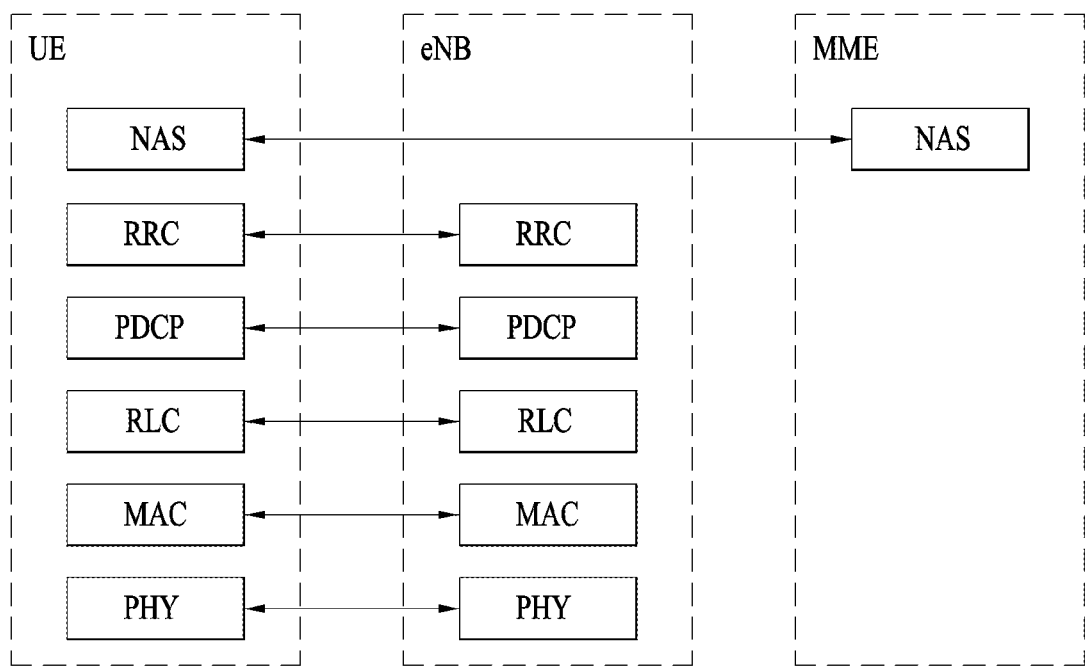
(A) CONTROL-PLANE PROTOCOL STACK
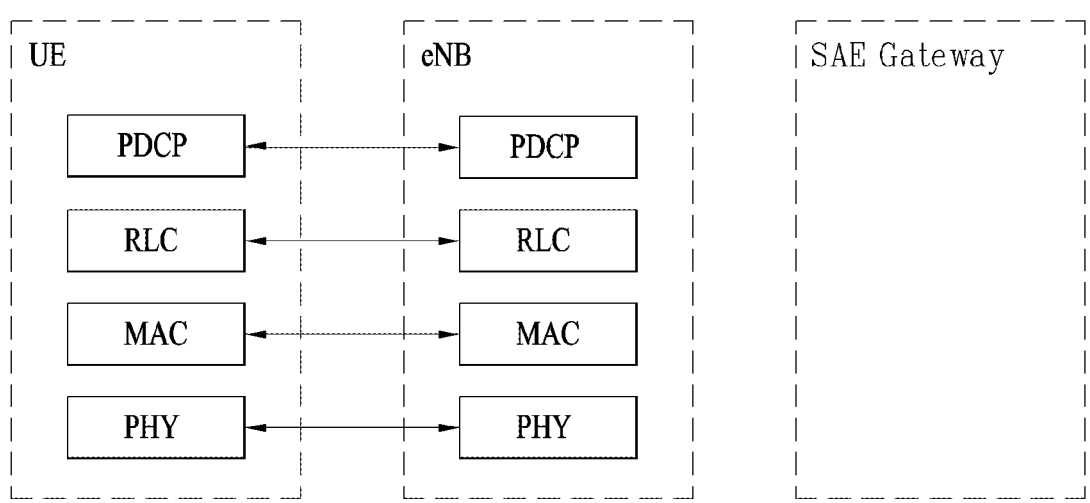
(B) USER-PLANE PROTOCOL STACK

FIG. 9

| | TTI 0 | TTI 1 | TTI 2 |
|---|---|---|---|

| Cell A | TX | No TX | TX |
|---|---|---|---|

| Cell B | Sense | No TX | Sense | TX | Sense | No TX |
|---|---|---|---|---|---|---|

| TTI 0-0 | TTI 0-1 | TTI 0-2 | TTI 0-3 | TTI 1-0 | TTI 1-1 | TTI 1-2 | TTI 1-3 | TTI 2-0 | TTI 2-1 | TTI 2-2 | TTI 2-3 |
|---|---|---|---|---|---|---|---|---|---|---|---|

PRIORITY-BASED INTERFERENCE CONTROL METHOD IN WIRELESS COMMUNICATION SYSTEM AND DEVICE THEREFOR

CROSS-REFERENCE TO RELATED APPLICATIONS

This application is a National Stage application under 35 U.S.C. § 371 of International Application No. PCT/KR2017/012209, filed on Nov. 1, 2017, which claims the benefit of U.S. Provisional Application No. 62/416,127, filed on Nov. 1, 2016. The disclosures of the prior applications are incorporated by reference in their entirety.

TECHNICAL FIELD

The present invention relates to a next generation wireless communication system, and more particularly, to a method of controlling priority based interference in a wireless communication system and apparatus therefor.

BACKGROUND ART

As an example of a mobile communication system to which the present invention is applicable, a $3^{rd}$ generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARD)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

DISCLOSURE OF THE INVENTION

Technical Task

Based on the aforementioned discussion, the technical task of the present invention is to propose a method of controlling priority based interference in a wireless communication system and apparatus therefor.

Technical Solutions

In one technical aspect of the present invention, provided herein is a method for a first cell to transmit/receive a signal on a specific resource set on which a priority given to a second cell is placed in a multi-cell communication system, the method including determining whether the second cell uses the specific resource set in a prescribed one of a plurality of first Transmit Time Intervals (TTIs) corresponding to the first cell and included in a single second TTI corresponding to the second cell and if determining that the second cell does not use the specific resource in the prescribed first TTI, transmitting/receiving the signal in the rest of the TTIs except the prescribed one of a plurality of the first TTIs.

In another technical aspect of the present invention, provided herein is a first cell configured to transmit/receive a signal on a specific resource set on which a priority given to a second cell is placed in a multi-cell communication system, the first cell including a wireless communication module and a processor connected to the wireless communication module, the processor configured to determine whether the second cell uses the specific resource set in a prescribed one of a plurality of first Transmit Time Intervals (TTIs) corresponding to the first cell and included in a single second TTI corresponding to the second cell, wherein if determining that the second cell does not use the specific resource in the prescribed first TTI, the processor is further configured to transmit/receive the signal in the rest of the TTIs except the prescribed one of a plurality of the first TTIs.

Preferably, if a load of the first cell in a different resource set on which a priority given to the first cell is placed is equal to or greater than a threshold, it is characterized in determining whether the second cell uses the specific resource set.

Preferably, in a different resource set on which a priority given to the first cell is placed, a plurality of second TTIs corresponding to the second cell are included in the prescribed first TTI corresponding to the first cell.

Preferably, the first cell detects a prescribed reference signal sequence within the prescribed first TTI. If the detected reference signal sequence corresponds to the second cell, it is characterized in determining that the second cell uses the specific resource in the prescribed first TTI.

Alternatively, in order to determine whether the second cell uses the specific resource set, it is characterized in receiving a control channel transmitted from the second cell in the prescribed first TTI.

Advantageous Effects

According to an embodiment of the present invention, interference coordination can be effectively performed in a manner of not using an exchange of information on a scheduling plan between base stations in a next generation wireless communication system or minimizing the use.

It will be appreciated by persons skilled in the art that that the effects that could be achieved with the present invention are not limited to what has been particularly described hereinabove and other advantages of the present invention will be more clearly understood from the following detailed description.

DESCRIPTION OF DRAWINGS

FIG. 2 is a diagram illustrating structures of a control plane and a user plane of a radio interface protocol between a UE and an E-UTRAN based on the 3GPP radio access network specification.

FIG. 9 shows an example of performing a sensing operation on a resource set based on a different TTI according to an embodiment of the present invention.

BEST MODE FOR INVENTION

Figure 1:
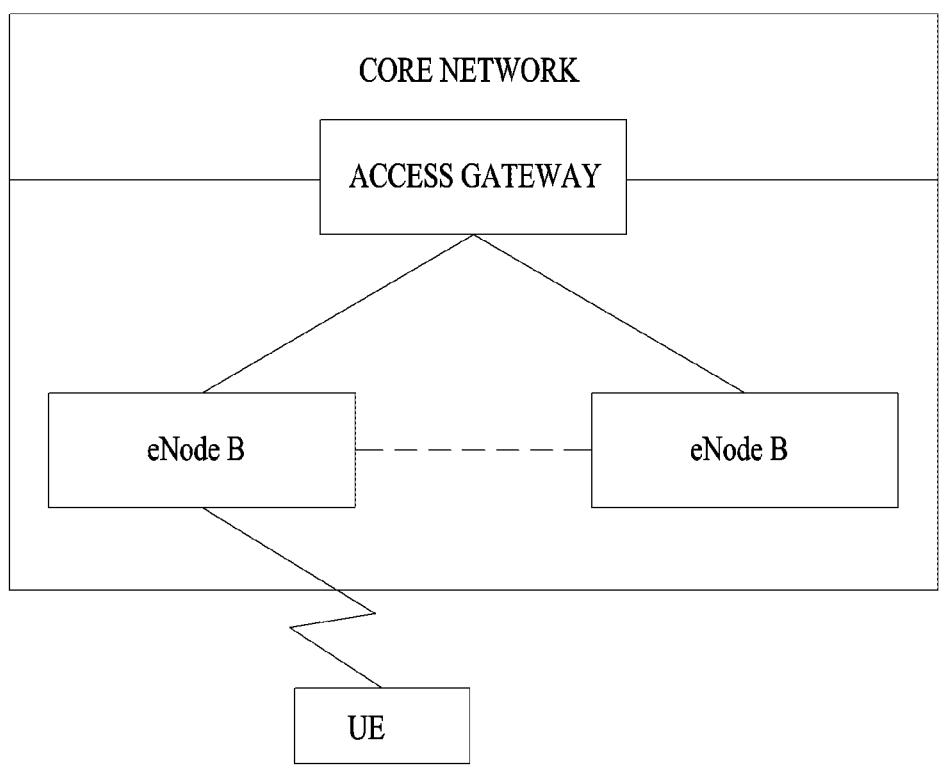
FIG. 1 is a diagram schematically illustrating a network structure of an E-UMTS as an exemplary radio communication system.

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition.

In the present disclosure, a base station (eNB) may be used as a broad meaning including a remote radio head (RRH), an eNB, a transmission point (TP), a reception point (RP), a relay, etc.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
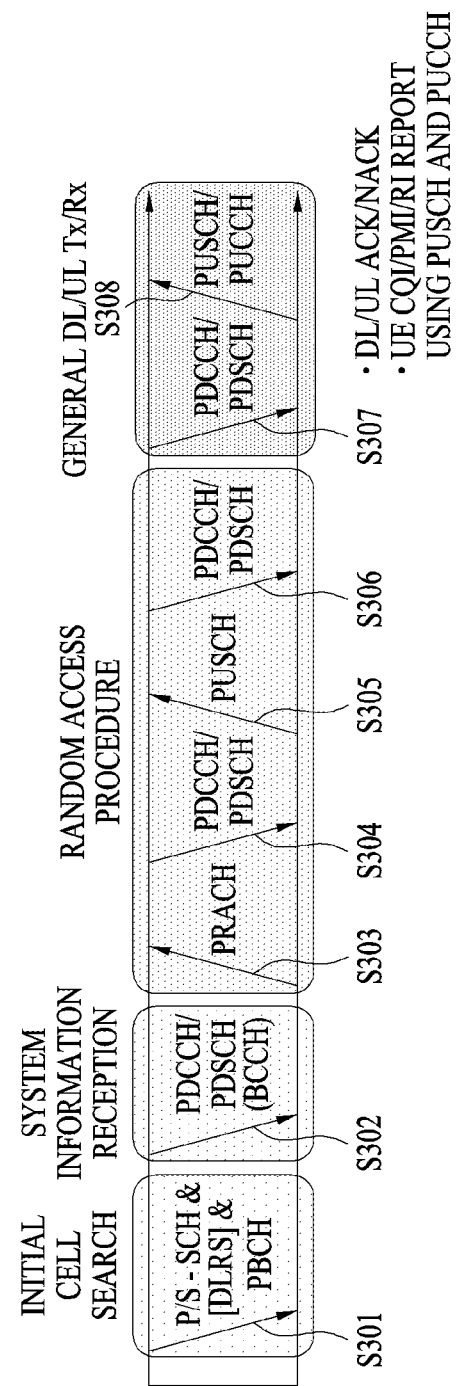
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
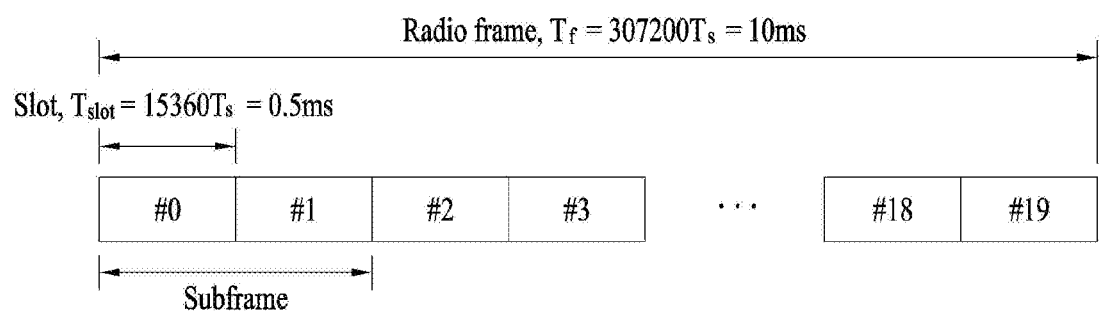
FIG. 4 is a diagram illustrating the structure of a radio frame used in an LTE system.

FIG. 4 is a diagram illustrating the structure of a radio frame used in an LTE system.

Referring to FIG. 4, the radio frame has a length of 10 ms ($327200 \times T_s$) and includes 10 equal-sized subframes. Each of the subframes has a length of 1 ms and includes two slots. Each slot has a length of 0.5 ms ($15360 \, T_s$). In this case, $T_s$ denotes a sampling time represented by $T_s = 1/(15 \text{ kHz} \times 2048) = 3.2552 \times 10^{-8}$ (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
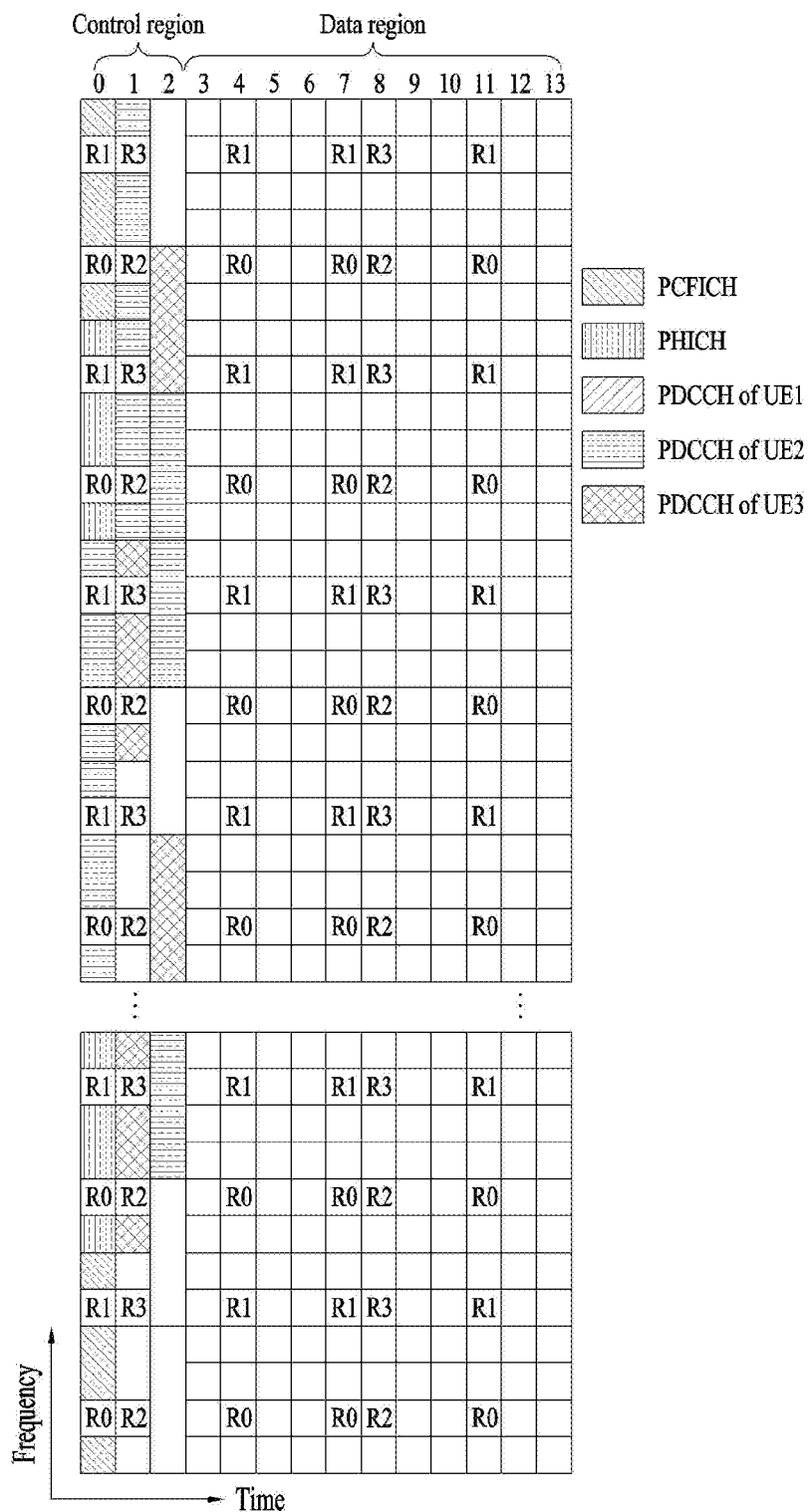
FIG. 5 is a diagram illustrating the structure of a DL radio frame used in an LTE system.

FIG. 5 is a diagram illustrating control channels contained in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
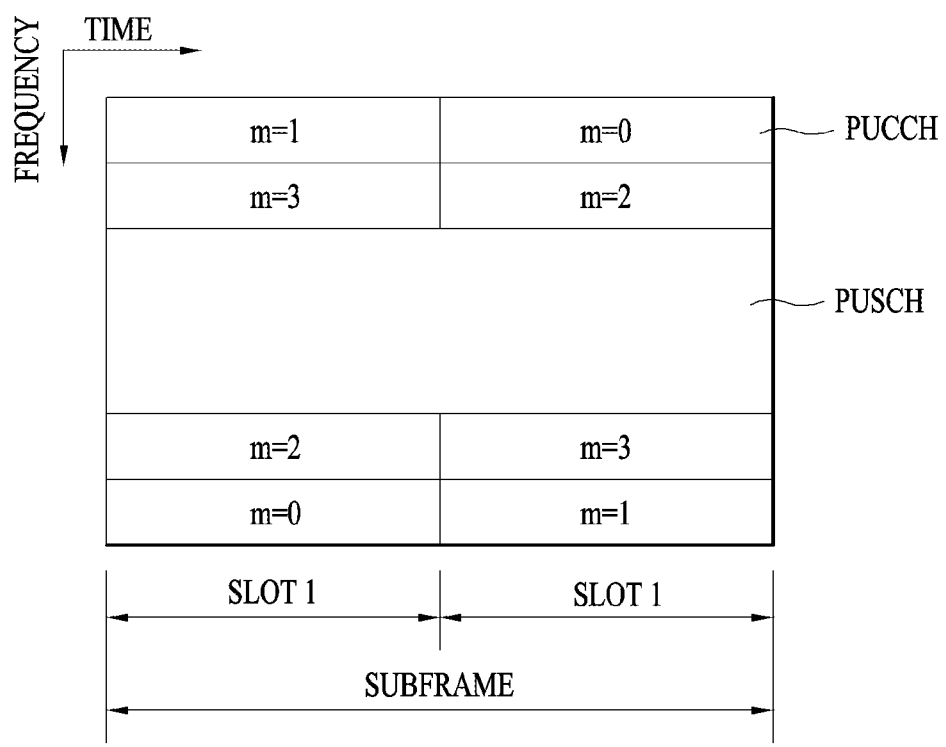
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

Meanwhile, as a wavelength is shortened in Millimeter Wave (mmW), a multitude of antenna elements can be installed in the same area. Particularly, a wavelength on 30 GHz band is 1 cm and total 64 (=8×8) antenna elements of a 2D (dimension) array type can be installed on a panel in a size of 4×4 cm with an interval of 0.5 lambda (wavelength). Thus, according to the recent trend of mmW fields, a multitude of antenna elements are used to increase coverage by raising a BeamForming (BF) gain or attempt the increase of throughput.

In this case, if Transceiver Unit (TXRU) is provided to enable transmission power and phase adjustments per antenna element, independent beamforming is available per frequency resource. Yet, if TXRU is installed for each of about 100 antenna elements, it is inefficient in aspect of costs. Therefore, currently considered is a scheme of mapping a multitude of antenna elements to a single TXRU and adjusting a direction of a beam with an analog phase shifter. Since such an analog beamforming scheme can make a single beam direction only, it is disadvantageous in that a frequency selective beamforming cannot be performed.

As an intermediate form between digital beamforming and analog beamforming, it is able to consider hybrid beamforming having B TXRUs less than Q antenna elements. In this case, although there is a difference according to a type of the connection between the B TXRUs and the Q antenna elements, the number of the simultaneously transmittable beam directions is limited to B or less.

Figure 7:
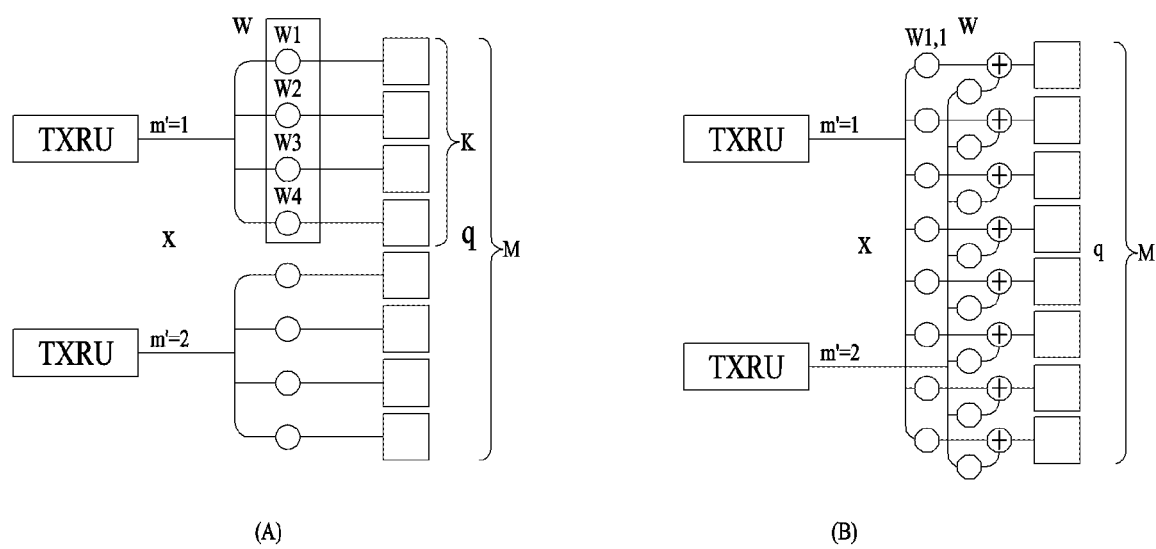
FIG. 7 shows examples of types of connections between TXRU and antenna elements.

FIG. 7 shows examples of types of connections between TXRU and antenna elements.

FIG. 7 (a) shows a type that a TXRU is connected to a subarray. In this case, an antenna element is connected to a single TXRU only. On the contrary, FIG. 7 (b) shows a type that a TXRU is connected to all antenna elements. In this case, an antenna element is connected to all TXRUs. In FIG. 7, W indicates a phase vector multiplied by an analog phase shifter. Namely, a direction of analog beamforming is determined by W. Here, the mapping between a CSI-RS antenna port and TXRUs may correspond to 1-to-1 or 1-to-many.

Meanwhile, in case that two adjacent cells use the same frequency band or adjacent frequency bands, a signal transmission from one cell may cause strong interference to communication in another cell. In this case, if the two cells operate by performing appropriate interference coordination, communication performance can be raised. Particularly, in order to perform the interference coordination smoothly, participating cells exchange a scheduling plan of a specific resource, e.g., information indicating that a prescribed user equipment will be scheduled on a prescribed resource with a prescribed attribute (e.g., precoder, transmit power, Modulation and Coding Scheme (MCS), one of uplink transmission and downlink transmission, etc.). If strong interference from an adjacent cell is expected based on the exchanged scheduling plan, it is preferable that each cell appropriately copes with it in a manner of scheduling a transmission of a type less affected by the corresponding interference. Yet, such an operation has a disadvantage that it takes a considerable time to exchange a scheduling plan between base stations. Of course, a scheduling plan may be determined in advance and then exchanged, which is disadvantageous in that a situation of an occurrence timing of an actual transmission cannot be reflected sufficiently.

To solve such a problem, described in the present invention is a method of effectively performing interference coordination by not using an exchange of information on a scheduling plan between base stations or minimizing the use of the information exchange. Particularly, described is a method of obtaining information on a scheduling plan of a different cell indirectly through a wireless channel in a manner of detecting/measuring presence of occurrence of a transmission on a specific resource from the different cell and an extent of the occurrence in case of the presence of the occurrence and then determining how each cell will make a schedule based on the detection/measurement. Thus, an operation of obtaining presence or non-presence of a transmission of a different cell on a wireless channel may be referred to as a sensing operation.

<Sequential Resource Utilization According to Load>

First of all, a series of adjacent cells divide a whole resource into a plurality of resource sets in advance and a condition for each cell to use each resource set is preferably determined in advance. Particularly, a specific resource set may be determined as a resource that can be always used by a specific cell. As the corresponding cell can use the corresponding resource set unconditionally, it can perform minimum communication through it. Such a resource may be called a resource on which the corresponding cell has a top priority.

Meanwhile, it can be provided that a predetermined condition should be met in order for each cell to use each resource set except a resource set on which the corresponding cell has a top priority. Particularly, the resource set except the resource set on which each cell has the top priority may include a resource set on which a different cell has a top priority. In this case, it is important to secure minimum communication performance.

As a specific condition, it can be provided that a specific cell can use a specific resource set on which the specific cell does not have a top priority only if it is detected that the corresponding resource set is not used by a different cell. Such detection can be obtained by determining whether an energy measured from the corresponding resource set is equal to or higher than a predetermined level or whether a signal (e.g., a reference signal) of a different cell having a priority for the corresponding resource is detected with a power equal to or higher than a predetermined level. Such a measurement may be directly performed by a base station, or obtained by the base station in a manner that a user equipment takes a measurement and then reports it to the base station.

Moreover, in order to easily obtain whether a specific resource set is used by a different cell, it is able to predesignate a few resource (referred to as an adjacent cell detection resource) that can be transmitted by a specific cell only but not be used by another neighbor cell. Through a signal reception power in the corresponding adjacent cell detection resource, the following operation is available. First of all, it is obtained whether a predesignated specific cell performs a transmission on the corresponding resource and whether the corresponding cell performs a transmission on a resource set linked to it. A specific adjacent cell detection resource may be a subset of a linked resource set or configured using a specially separated resource.

Particularly, once a predetermined load is put on a specific cell, a similar load may last for a predetermined time, if it is determined that the specific cell used a specific resource set at a previous timing, it can be assumed that the specific cell will use the corresponding resource set at a next timing. If it is determined that the specific resource set is used by a different cell, and more particularly, by a cell having a top priority for the corresponding resource, the specific cell may operate not to use the corresponding resource set any more for a predetermined time.

Figure 8:
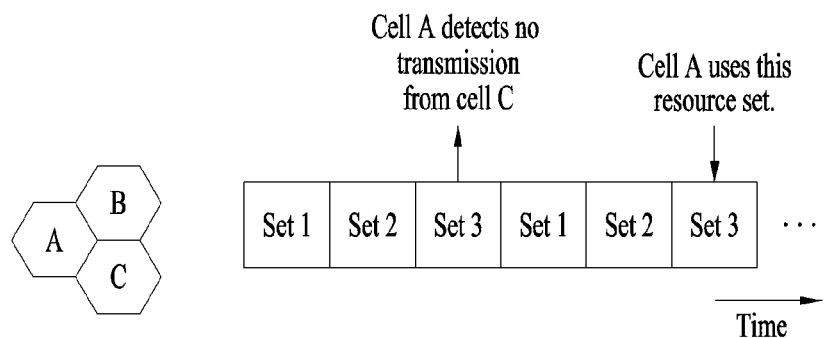
FIG. 8 shows an example of configuring a whole resource with resource sets having a top priority given to each cell according to an embodiment of the present invention.

FIG. 8 shows an example of configuring a whole resource with resource sets having a top priority given to each cell according to an embodiment of the present invention. Particularly, the following situation is assumed. First of all, a whole resource is configured with resource sets 1 to 3, a cell A has a top priority on the resource set 1, a cell B has a top priority on the resource set 2, and a cell C has a top priority on the resource set 3.

Referring to FIG. 8, if the cell A determines that there is no transmission of the cell C on the resource set 3 through a sensing operation, it is observed that the cell A operates to use the resource set 3 of a next timing. Particularly, such an operation is effective in scheduling a user equipment located at a cell edge. In detail, in a situation that the cell C, which is the cell having a priority on the resource set 3, performs an uplink transmission, if the cell A having a low priority performs a downlink transmission, as the downlink transmission may possibly work as considerable interference on the uplink transmission, such sensing and resource division operations are required.

In addition, it can be provided that each cell should attempt to use a resource set on which the corresponding cell does not have a priority only if a load put on the corresponding cell becomes equal to or higher than a predetermined level. Namely, if the corresponding cell can handle the load put on the corresponding cell with a resource set of which top priority is given to the corresponding cell, it is induced not to use other resource sets. Particularly, according to such restriction, it is able to reduce interference due to an error possibly occurring in a step of determining presence or non-presence of a use by a different cell.

This can be generalized as follows. First of all, a system divides a whole resource into a plurality of resource sets, and each cell may define a condition for using a specific resource set into a form of a load put on the corresponding cell. For example, a cell having a top priority on the resource set 1 can be defined as follows. First of all, the cell uses the resource set 1 irrespective of load. If the load is equal to or greater than X, the cell may use the resource set 2. And, if the load is equal to or greater than Y (>X), the cell may use the resource set 3.

<Sensing Method Using Time Resource Unit of Different Length>

Transmission of an individual physical channel is performed using a series of time resources, and a time interval becoming a basic unit of scheduling may be named Transmit Time Interval (TTI). A length of the TTI can be set to an appropriate value according to a communication operation, a service requirement or the lie and related to a subcarrier spacing. Namely, the wider the subcarrier spacing gets, the shorter a length of an OFDM symbol becomes. Hence, the TTI length itself may be shortened.

In this case, if a cell having a high priority on a specific resource set has a TTI length longer than that of a cell having a low priority thereon, the cell having the low priority detects whether a transmission of high interference actually occurs in a corresponding TTI from a prescribed interval of a front part of each TTI to be possibly used by the cell having the high priority. Thereafter, only if determining that an interference situation is not high or that a transmission scheme (e.g., a scheme of using a beam of precoder in a direction orthogonal to an interference direction) of avoiding such an interference situation is applicable, the cell having the low priority can perform a transmission of its own using a resource on the rest of the interval.

FIG. 9 shows an example of performing a sensing operation on a resource set based on a different TTI according to an embodiment of the present invention. In particular, TTI 0 to TTI 2 shown in FIG. 9 assume resources on which a cell A has a top priority like the aforementioned resource set 1 of FIG. 8. Therefore, on the resource set 1, the cell A operates with reference to a TTI relatively longer than that of a cell B. In more particular, in FIG. 9, it is assumed that 4 TTIs of the cell B correspond to a single TTI of the cell A.

Referring to FIG. 9, for the resource set 1, the cell B determines whether a transmission of the cell A exists in one (e.g., TTI 0-0, TTI 1-0, and TTI 2-0) of every 4 TTIs. Only if determining that the transmission of the cell A does not exist, the cell B uses the 3 remaining TTIs. Unlike FIG. 9, the 3 remaining TTIs may be configured as a single TTI. Namely, a single TTI of the cell A in the resource set 1 is configured with a TTI for the sensing of the cell B and a TTI for communication of the cell B, and the TTI for the communication may be defined as a single unit into which TTI 0-1, TTI 0-2 and TTI 0-3 in FIG. 9 are merged.

Meanwhile, in performing the above-described operation, a cell using a long TTI with a higher priority may be used in a macro cell that provides a wide coverage with high power. Particularly, since a delay spread of a channel increases as a coverage becomes wider, it conforms to the aspect that a cyclic prefix having a longer length may be possibly required. On the contrary, a cell using a short TTI with a low priority may be used in a small cell used for traffic boost while providing a narrow coverage.

In the following description, a detailed method of determining whether a transmission of a different cell, and more particularly, a cell having a higher priority on a specific resource exists on the specific resource is described.

First of all, each cell detects a reference signal of a different cell, thereby making such a determination. In this case, as a sequence of a reference signal used by each cell is limited to a predetermined set in advance, when a reference signal of a specific sequence is detected from the different cell, the corresponding cell may recognize that the detected reference signal is used by which cell and determine whether to operate on the corresponding resource with a low priority.

Or, each cell may make such a determination by decoding a control channel of a different cell. Particularly, each cell may receive a control channel indicating that a specific resource set will be used for which usage (e.g., uplink scheduling or downlink scheduling) in a different cell, whether a scheduling itself exists, or the like.

Or, it can be inferred from a received energy on a specific resource. Yet, in this case, it may be difficult to obtain that this energy actually results from which cell.

Figure 10:
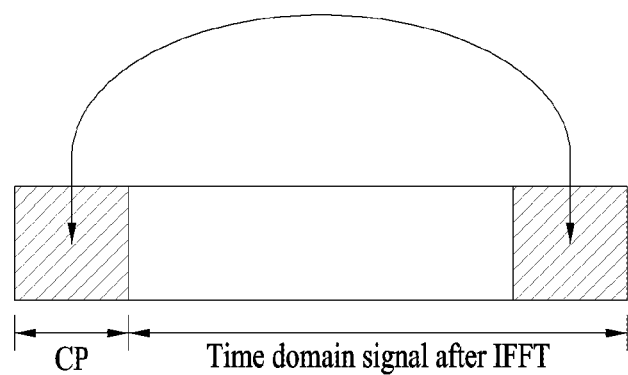
FIG. 10 shows an example of performing a sensing operation on a resource set based on a cyclic prefix length according to an embodiment of the present invention.

Or, it may be able to determine presence or non-presence of a transmission of a cell having a TTI of a different length through a length of a cyclic prefix. FIG. 10 shows an example of performing a sensing operation on a resource set based on a cyclic prefix length according to an embodiment of the present invention.

Referring to FIG. 10, a specific cell finds the correlation between a received signal and a received signal delayed by a CP length in an OFDM symbol length of a different cell that may exist probably. If a value of the correlation is equal to or higher than a predetermined level, the specific cell may determine that there exists the different cell that uses a TTI of the corresponding length. This uses the attribute that a cyclic prefix of OFDM copies a last portion of a time signal of an OFDM symbol. Hence, if the correlation value between the two received signal components spaced apart from each other by a predetermined time interval becomes equal to or higher than a predetermined level, the specific cell can determine that a cell having an OFDM symbol length corresponding to the corresponding time interval performed the transmission at the corresponding timing.

<Signal Transmission on Resource Having Low Priority>

In performing the above-described operation, a specific cell may transmit data on a resource set on which the specific cell has a low priority depending on a situation. In this case, it may be provided that a signal transmitted on the corresponding resource set can protect a signal, to which interference may be caused by the transmitted signal, of a cell having a high priority.

For example, transmission power can be reduced with respect to a resource with a low priority. Or, in case of uplink transmission or UE-to-UE direct communication, an operation may be performed so as not to schedule a user equipment having a high priority around a cell.

For another example, by adapting an attribute of a transmitted signal to an attribute of a cell having a high priority, the cell having the high priority may operate to facilitate the cancellation of the transmitted signal that is an interference signal. Particularly, a specific cell can use the same TTI length, subcarrier spacing, cyclic prefix length and the like of the cell having the high priority in a resource set on which the specific cell has a low priority. If a different cell has a different Radio Access Technology (RAT), the specific cell may operate to set an RAT to the same.

The above-described operation may be restricted to a case of determining that there is no transmission of a cell having a high priority on a specific resource set. Namely, in case of determining that there is no transmission of the cell having the high priority on the specific resource set, an optimal transmission scheme is selected without such restriction. On the contrary, in case of determining that there is a transmission of the cell having the high priority, an operation may be performed to protect performance of the cell having the high priority by applying the above-described restriction.

Figure 11:
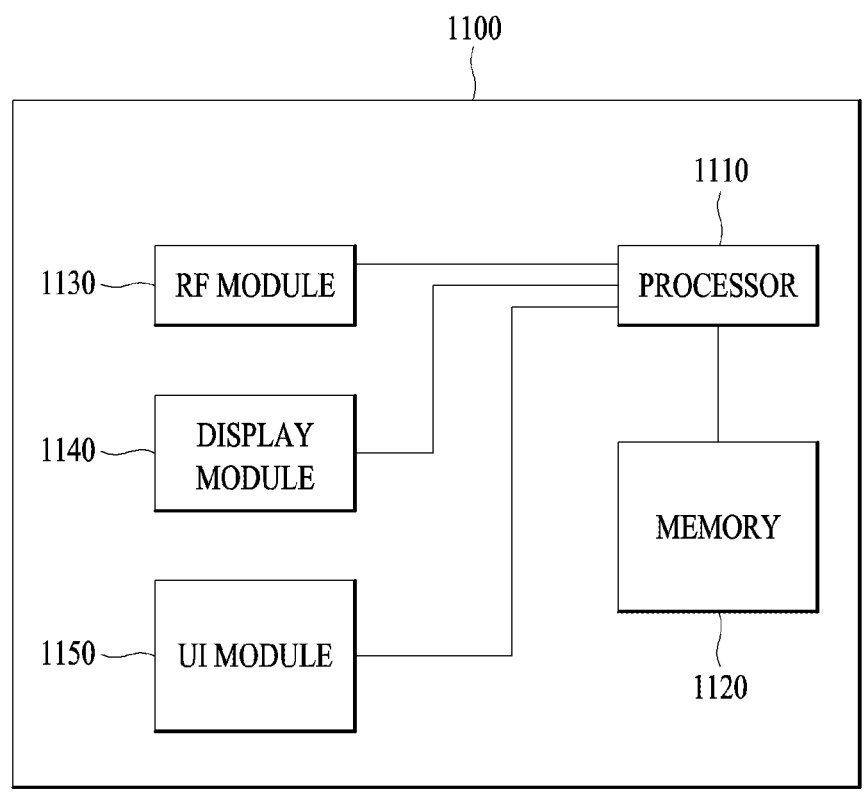
FIG. 11 is a block diagram illustrating a communication device according to embodiments of the present invention.

FIG. 11 is a block diagram of a communication apparatus according to an embodiment of the present invention.

Referring to FIG. 11, a communication device 1100 includes a processor 1110, a memory 1120, a radio frequency (RF) module 1130, a display module 1140, and a user interface (UI) module 1150.

The communication device 1100 is illustrated for convenience of description and some modules may be omitted. The communication device 1100 may further include necessary modules. Some modules of the communication device 1100 may be further divided into sub-modules. The processor 1100 is configured to perform operations according to the embodiments of the present invention exemplarily described with reference to the drawings. Specifically, for a detailed description of operations of the processor 1100, reference may be made to the description described with reference to FIGS. 1 to 10.

The memory 1120 is connected to the processor 1110 and stores operating systems, applications, program code, data, and the like. The RF module 1130 is connected to the processor 1110 and performs a function of converting a baseband signal into a radio signal or converting a radio signal into a baseband signal. For this, the RF module 1130 performs analog conversion, amplification, filtering, and frequency upconversion or performs inverse processes thereof. The display module 1140 is connected to the processor 1110 and displays various types of information. The display module 1140 may include, but is not limited to, a well-known element such as a liquid crystal display (LCD), a light emitting diode (LED), or an organic light emitting diode (OLED). The UI module 1150 is connected to the processor 1110 and may include a combination of well-known UIs such as a keypad and a touchscreen.

The above-described embodiments are combinations of elements and features of the present invention in a predetermined manner. Each of the elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, claims that are not explicitly dependent upon each other may of course be combined to provide an embodiment or new claims can be added through amendment after the application is filed.

In this document, a specific operation described as performed by an eNB may be performed by an upper node of the eNB. Namely, it is apparent that, in a network comprised of a plurality of network nodes including an eNB, various operations performed for communication with a UE may be performed by the eNB, or network nodes other than the eNB. The term eNB may be replaced with the terms fixed station, Node B, eNode B (eNB), access point, etc.

The embodiments according to the present invention can be implemented by various means, for example, hardware, firmware, software, or combinations thereof. In the case of a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of a firmware or software configuration, the method according to the embodiments of the present invention may be implemented by a module, a procedure, or a function, which performs functions or operations described above. For example, software code may be stored in a memory unit and then may be executed by a processor. The memory unit may be located inside or outside the processor to transmit and receive data to and from the processor through various well-known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although the aforementioned method of controlling priority based interference in a wireless communication system and apparatus therefor are described by focusing on examples applying to the 3GPP LTE system, they are applicable to various wireless communication systems as well as to the 3GPP LTE system.

What is claimed is:

1. A method performed by a network node including a first cell to transmit/receive a signal on a specific resource set in a time domain, on which a higher priority is given to a second cell, in a multi-cell communication system, the method comprising:
   determining whether the second cell uses the specific resource set in a prescribed one of a plurality of first Transmit Time Intervals (TTIs) corresponding to the first cell and included in a single second TTI corresponding to the second cell, based on a load of the first cell in another resource set different in the time domain from the specific resource set, on which a higher priority is given to the first cell, being equal to or greater than a threshold;
   based on the second cell being determined not to use the specific resource set in the prescribed one of the plurality of the first TTIs, transmitting/receiving the signal in the rest of the plurality of the first TTIs except the prescribed one of the plurality of the first TTIs without applying a restriction; and
   based on the second cell being determined to use the specific resource set in the prescribed one of the plurality of the first TTIs, transmitting/receiving the signal in the rest of the plurality of the first TTIs except the prescribed one of the plurality of the first TTIs with applying the restriction,
   wherein the restriction includes configuring at least one of a same TTI length as the second cell, a same subcarrier spacing as the second cell, a same cyclic prefix length as the second cell, or a same radio access technology as the second cell.

2. The method of claim 1, wherein in the another resource set on which a higher priority is given to the first cell, a plurality of second TTIs corresponding to the second cell are included in the prescribed one of the plurality of the first TTIs corresponding to the first cell.

3. The method of claim 1, wherein the determining whether the second cell uses the specific resource set comprises:
   detecting a prescribed reference signal sequence within the prescribed one of the plurality of the first TTIs; and
   based on the detected reference signal sequence corresponding to the second cell, determining that the second cell uses the specific resource set in the prescribed one of the plurality of the first TTIs.

4. The method of claim 1, wherein the determining whether the second cell uses the specific resource set comprises: receiving a control channel transmitted from the second cell in the prescribed one of the plurality of the first TTIs.

5. A network node including first cell configured to transmit/receive a signal on a specific resource set in a time domain, on which a higher priority is given to a second cell, in a multi-cell communication system, the network node including the first cell comprising:
   a wireless communication module; and
   a processor connected to the wireless communication module, the processor configured to determine whether the second cell uses the specific resource set in a prescribed one of a plurality of first Transmit Time Intervals (TTIs) corresponding to the first cell and included in a single second TTI corresponding to the second cell, based on a load of the first cell in a another resource set different in the time domain from the specific resource set, on which a higher priority is given to the first cell, being equal to or greater than a threshold,
   wherein, based on the second cell being determined not to use the specific resource in the prescribed one of the plurality of the first TTIs, the processor is further configured to transmit/receive the signal in the rest of the plurality of the first TTIs except the prescribed one of the plurality of the first TTIs without applying a restriction,
   wherein, based on the second cell being determined to use the specific resource set in the prescribed one of the plurality of the first TTIs, the processor is further configured to transmit/receive the signal in the rest of the plurality of the first TTIs except the prescribed one of the plurality of the first TTIs with applying the restriction, and
   wherein the restriction includes configuring at least one of a same TTI length as the second cell, a same subcarrier spacing as the second cell, a same cyclic prefix length as the second cell, or a same radio access technology as the second cell.

6. The network node including first cell of claim 5, wherein in the another resource set on which a higher priority is given to the first cell, a plurality of second TTIs corresponding to the second cell are included in the prescribed one of the plurality of the first TTIs corresponding to the first cell.

7. The network node including first cell of claim 5, wherein the processor is further configured to detect a prescribed reference signal sequence within the prescribed one of the plurality of the first TTIs, and
   wherein, based on the detected reference signal sequence corresponding to the second cell, the processor determines that the second cell uses the specific resource set in the prescribed one of the plurality of first TTIs.

8. The network node including first cell of claim 5, wherein the processor is further configured to receive a control channel transmitted from the second cell in the prescribed one of the plurality of the first TTIs to determine whether the second cell uses the specific resource set.

* * * * *